United States Patent [19]
Schmidt

[11] Patent Number: 5,176,339
[45] Date of Patent: Jan. 5, 1993

[54] RESILIENT PIVOT TYPE AIRCRAFT MOUNTING

[75] Inventor: Warren E. Schmidt, Erie, Pa.

[73] Assignee: Lord Corporation, Erie, Pa.

[21] Appl. No.: 770,058

[22] Filed: Sep. 30, 1991

[51] Int. Cl.$^5$ .............................................. B64D 27/00
[52] U.S. Cl. ..................................... 244/54; 244/131; 60/39.31; 248/557; 248/638
[58] Field of Search ..................... 244/54, 131, 110 B; 60/39.31; 248/557, 554, 555, 556, 592, 594, 638; 267/257, 258, 141.3, 153, 292, 293

[56] References Cited

U.S. PATENT DOCUMENTS

| | | | |
|---|---|---|---|
| 1,862,484 | 6/1932 | Lord et al. | |
| 2,380,274 | 11/1940 | Trott | 248/5 |
| 2,395,143 | 2/1946 | Prewitt | 244/18 |
| 3,288,404 | 11/1966 | Schmidt et al. | 248/5 |
| 3,907,220 | 9/1975 | Amelio | 244/54 |
| 4,065,077 | 12/1977 | Brooks | 244/54 |
| 4,605,186 | 8/1986 | Fernz | 244/110 B |
| 4,624,436 | 11/1986 | Cooney et al. | 248/555 |
| 4,805,851 | 2/1989 | Herbst | 244/54 |
| 4,821,980 | 4/1989 | Clausen et al. | 244/54 |

FOREIGN PATENT DOCUMENTS 0767066 8/1951 Fed. Rep. of Germany ...... 248/557

Primary Examiner—Joseph F. Peters, Jr.
Assistant Examiner—Christopher P. Ellis
Attorney, Agent, or Firm—Richard K. Thomson

[57] ABSTRACT

A pivot type aircraft mounting for resiliently connecting a structure to an aircraft engine which uses a pivoting and siding joint on a beam at the engine attachment point, a vertically stiff and laterally soft intermediate pivot joint on the beam, and a resilient compression section near the end of the beam for reacting the engine loads into the structure and providing the desired spring rates in the vertical and lateral direction. The invention can utilize low friction pivoting and sliding joints such as nylon lines bearings or elastomeric bearings. The compression section can be metal mesh for high temperature applications or of elastomeric or laminated elastomeric construction for normal operating temperatures. The remote location of the compression section is particularly well suited for addition of fluid for adding damping or tuned absorber effects.

20 Claims, 6 Drawing Sheets

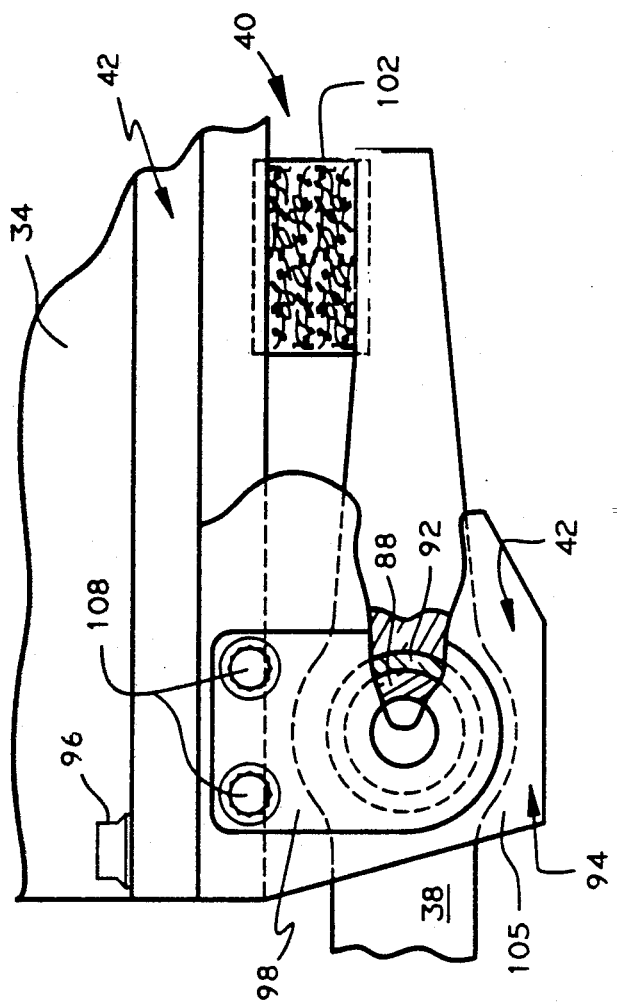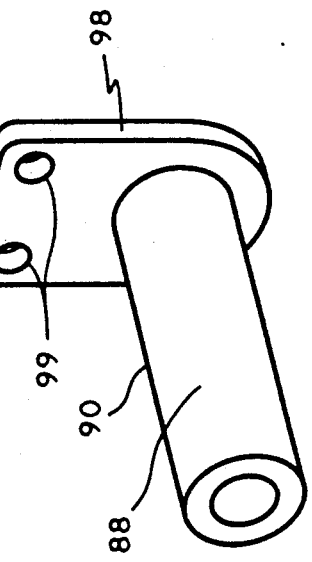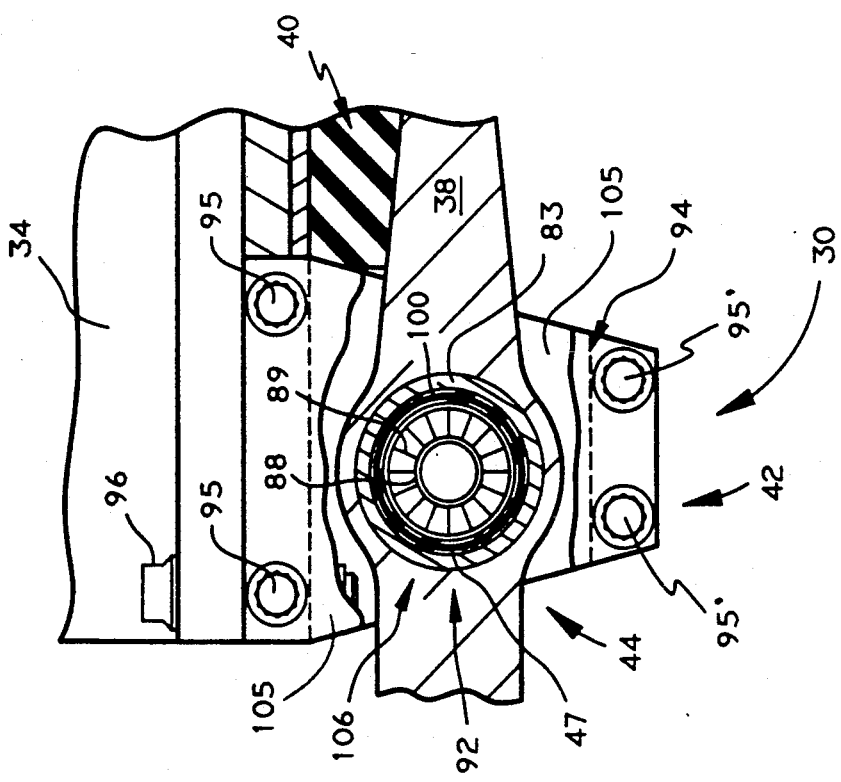

RESILIENT PIVOT TYPE AIRCRAFT MOUNTING

FIELD OF THE INVENTION

The invention relates to the area of supports for aircraft engines. More particularly, the invention is directed to the area of resilient aircraft mountings for supporting loads and providing vibration isolation.

BACKGROUND OF THE INVENTION

A variety of different mountings are available for mounting an engine to a structure. U.S. Pat. No. 4,065,077 issued to Leslie Brooks discloses an attachment bracket for mounting a jet propulsion engine to a fixed structure comprised of a bracket 20a, a boss structure 16a with a spherical sleeve 40 and a link 42. This invention allows rigid support the engine for providing pivoting and sliding at a point near the engine case. The '077 patent does not disclose any resiliency for providing isolation of the engine.

The commonly assigned U.S. Pat. No. 4,805,851 issued to Paul Herbst discloses a Turbine Engine Mounting Bracket Assembly for attaching an engine below the wing pylon. It is comprised of a mounting base 13, a torque tube 22 with a pair of connected arms 20 and 21 and a laminated elastomeric bearing assembly 26. The assembly pivots about the elastic center of the elastomeric bearing assembly 26. It also pivots at a second point where the engine hanger or linkage 11 attaches to the arms 20 and 21. However, this second connection is not resilient. The elastomer section reacts the loads by cocking of the elastomer bearing assembly 26.

The commonly assigned U.S. Pat. No. 3,288,404 issued to Warren Schmidt et al., discloses an Engine Mounting System for isolating an engine and providing restraint of rotational motion. FIGS. 4 and 7 show a torque tube 12 and crank arms 10 and 11 attached resiliently to bracket 4 similar to that of the aforementioned Herbst mounting of the '851 patent. The aft portion of the engine is supported by the aft mounting assembly comprised of a lever 31, resilient mountings 22 and 22a, and bracket 5. The engine is attached by struts 33 and pivots at ball joint 34. However, under large engine loads due to engine rotation, the bodies of elastomer 23 within elements 22 and 22a will encounter undesirable cocking motions. In addition, expansion of the engine due to temperature will impart shear strains into the resilient mountings 22 and 22a.

U.S. Pat. No. 4,272,101 issued to Chambon and U.S. Pat. No. 4,605,186 issued to Fernz also disclose other types of resilient pivoting type mountings.

SUMMARY OF THE INVENTION

The present invention relates to a pivot type engine mounting, particularly of the type which utilizes resilient elements for allowing pivotal motions of a pivoting beam and providing controlled spring rates in all directions for providing adequate isolation. Also provided is a pivoting slip joint in the forward (fore) and aft directions for allowing the beam to pivot relative to the engine, yet slide along the pivoting beam. In this way, the mount can accommodate the large deflections resulting from high thrust loads and the fore and aft engine expansion deflections due to temperature changes. The present invention has particular utility in providing vibration isolation by allowing soft vertical and lateral spring rates by placing the resilient elements remote from the engine attachment point. In this manner, soft spring rates can be provided even though the space envelope is inadequate at the engine attachment point to accommodate the resulting large deflections. In essence, the mounting transfers the motions from a point where the deflections can't be accommodated to a point where they can be. This remote feature also allows the resilient elements to be used in direct shear or direct compression for maximizing service life. Finally, the remote feature allows the addition of fluid for adding damping or for adding fluid tuned isolator effects. Additional inventive features will become apparent after reading the accompanying detailed descriptions.

BRIEF DESCRIPTION OF THE DRAWINGS

FIG. 3 is a side view in partial section of an embodiment comprising a second elastomeric pivot having a laminated tube form construction and a single elastomeric compression pad;

FIG. 4 is a side view in partial section of a rotation locking means for the second reduced friction pivot joint and a metal mesh compression pad;

FIG. 5 is a perspective view of a locking plate on a pin used for locking the rotation of the pin in the second reduced friction pivot joint;

DETAILED DESCRIPTION OF THE INVENTION

Figure 1:
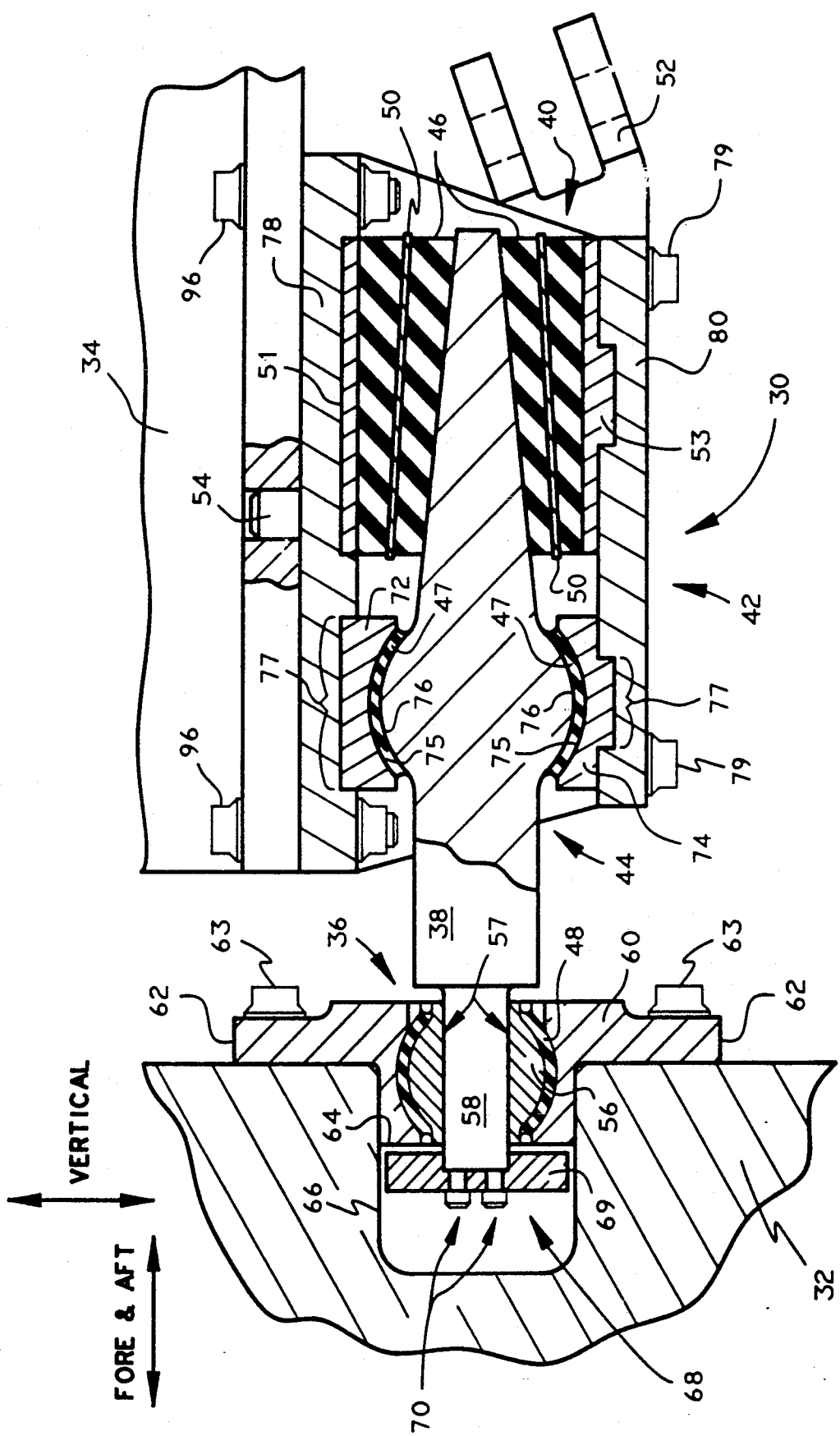
FIG. 1 is a side view in partial section of an embodiment comprising a first elastomeric pivot, a second elastomeric pivot and two laminated elastomeric compression pads.

In the following, the invention will be described in detail with respect to the preferred embodiments and the attached illustrations, and drawings. Referring now to FIG. 1, a resilient engine mounting 30 is attached to an aircraft engine 32 and to a structure 34. The mounting 30 is comprised of a beam 38, a first pivot means 36 on one end portion of said beam 38 and a spring means 40 near the other end portion of the beam 38. Intermediate between the spring means 40 and the first pivot means 36 at a third beam portion is a second pivot means 44.

The function of the mounting 30 is to flexibly support the engine 32 and allow engine motions relative to the structure 34. This motion occurs due to steady and vibratory loads that are applied during flight conditions. Typically, the mounting 30 is required to be soft for isolating vibratory inputs. The present invention vertical static stiffness is about 50,000 lb/in, while lateral is about 15,000 lb/in. These stiffnesses are approximate and can be changed based on the needs of the application. As mentioned before, systems generally require soft spring rates for adequate isolation. However, at the engine attachment point, there is generally very little space envelope available for accommodating an engine mount and its associated deflections. This is especially true when it is considered that because of the soft spring rates, a significant amount of deflection must be accommodated while the loads are applied. Both the relatively high motions required for good isolation, and the high loads associated with powerful engines most likely would lead to a relatively large isolator size.

For example, if the vertical load applied at the first pivot means 36 were 25,000 lb, a deflection of 0.5 inch would have to be accommodated in the rubber section of any mount that might be housed within the available space envelope or recess 66 in the engine 32. These large deflections would require a rubber section approximately 3 inches thick, which is virtually impossible to package within the recess. The novel feature of the present invention is placing the spring means 40 in a remote location from the engine recess 66, where it can be made the proper size to accommodate the motions and provide the proper spring rates required for adequate isolation. The first pivot means 36 and second pivot means 44 are both very stiff in the radial directions having spring rates of about 250,000 lb/in. However, they are soft in the shear directions, such as in cocking, for the first pivot means 36, and lateral shear for the second pivot means 44.

The illustration of FIG. 1 shows a generally spherical body of elastomer 48 bonded to the spherical inner surface of the outer member 60 and the spherical outer surface of the inner member 56. Typical elastomers that could used in mountings include Lord SPE®V for high temperature applications and Lord SPE®X for normal operating temperatures and SPE®XI for intermediate temperatures. However other suitable elastomers such as natural rubber and blends, polybutadiene blends, nitriles, neoprenes, fluorocarbons, silicones, fluorosilicones or similar elastomers could be used. This body of elastomer 48 acts in this embodiment as the friction reducing means for reducing the frictional forces associated with cocking or pivotal motions of the beam 38 relative to the engine 32 at the first pivot means 36. The first pivot means 36 further comprises an inner member 56, an outer member 60 which has a plurality of flanges 62 for attaching the outer member 60 to the engine 32. It is attached by any suitable fastening means 63, such as high strength bolts. The outer member 60 further includes a pilot 64 for locating the first pivot means 36 relative to recess 66 of said engine 32 and for restraining or reacting the shear loads, such that the fastening means 63 such as high strength bolts need only be subject to tensile loading.

The inner member 56 has an inner bore extending in the fore and aft directions therethrough for accepting a cylindrical pilot 58 on the beam 38. The outer surface of the beam pilot 58 or inner surface of the inner member 56 can be treated with a friction reducing means 57 such as teflon, nylon, dry film lubricant, or a filled grease. This will allow the two components to slide freely relative to each other in the fore and aft directions as well as in torsional rotation. This will also reduce fretting and wear of the surfaces of the beam pilot 58 and the inner member 56. The sliding action allows for the engine 32 to expand when it heats up. It also allows for deflection of the engine 32 relative to the strut 34 while under the application of thrust loads. Snubbing means 68 are formed by attaching snubbing plate 69 by fastening means 70, such as high strength bolts, to the pilot 58 on the beam 38 in order to limit the amount of motion allowed in the fore and aft direction and provide a safetied, fail safe or retention feature, to restrain the engine in the event a failure of a major engine component. Typically, deflections of up to +/−0.2 inch are allowed before snubbing occurs. During snubbing of engine movement in the forward direction, the snubbing plate 69 contacts the end of the pilot 64 on the outer member 60. During snubbing in the aft direction, the shoulder on the beam 38 contacts the face of the outer member 60 or inner member 56. Snubbing in any radial direction can be accomplished, such as in the vertical direction, by allowing the snubbing plate 69 to contact the recess 66 after a predetermined deflection. This will protect the elastomer body 47 from becoming over stressed in compression due to vertical or lateral loads. Typically aircraft materials should be used for the construction of the metal components such as 15-5 PH, 17-4 PH stainless steels, 4130 or 4340 steel, 6000/7000 series Aluminum, engineering filled plastics or rigid or flexible matrix composites. Other similar materials can be used without departing from the scope or intent of the invention.

The embodiment of FIG. 1 shows a second pivot means 44 attached to a portion of said beam 38 between the first pivot means 36 and the spring means 40. The second pivot means 44 is comprised of first cap 72 and second cap 74. The caps 72 and 74 have curved partially cylindrical surfaces 75 formed thereon. The beam 38 also has preferably matching partially cylindrical surfaces 76 formed on it. The surfaces 76 extend laterally across the width of the beam 38 in this embodiment. A body of elastomer 47 fills the space in between the curved surfaces 75 and 76, thus providing resiliency for providing reduced friction rotation of beam 38. The elastomer is preferably bonded to each cap 72 and 74 and the beam 38. The caps 72 and 74 have means for restraining relative movement between the caps 72 and 74 and the housing 42. In this embodiment, the caps 72 and 74 fit into pockets 77 formed within the 6000/7000 series Aluminum or an engineered plastic or a rigid or flexible matrix composite. Furthermore, any other suitable restraining means would be acceptable, such as bolting.

The second pivot means 44, which acts as the fulcrum or central pivot for the beam 38, is stiff vertically and in the fore and aft direction, yet soft laterally. Any laterally applied load will cause the second pivot means 44 and spring means 40 to translate laterally. This motion will be accommodated as pure shear in the bodies of elastomer 47. Very little lateral cocking will occur because the cocking restraint or yaw restraint is very high within the second pivot means 44. Of course, the lateral stiffness can be made stiffer if desired by adding further lateral spring elements in parallel with the body of elastomer 47 at a location near the second pivot means 44. Lateral snubbing can be accomplished at the second pivot means 44 by having the sides of the beam 38 contact the housing 42 at some predetermined deflection. The second pivot means 44 of this embodiment is preferably precompressed a sufficient amount to allow both bodies of elastomer 47 to remain precompressed under most normal operating loads.

The spring means 40 shown in FIG. 1 is comprised of upper end plate 51 and lower end plate 53, inelastic shims 50, and body of elastomer 46. The upper end plate 51, lower end plate 53 and shims 50 can be of any suitable material such as 15-5 PH or 15-7 PH steel or 4130/4340 steel, 6000/7000 series Aluminum or an engineered plastic or a rigid or flexible matrix composite. The elastomer used in spring means 40 can be SPE ® V or SPE ® X or SPE ® XI as earlier mentioned. Other suitable elastomers such as natural rubber and blends, polybutadiene blends, nitriles, neoprenes, fluorocarbons, silicones, fluorosilicones, and other synthetic elastomers are acceptable as well.

The spring means 40 is made up of two spring elements of inelastic shims 50 and elastomer layer in a laminated construction and are preferably precompressed. The bodies of elastomer 46 are bonded to plates 51 and 53, shims 50 and beam 38 using standard bonding processes known to those skilled in the art. The precompression of the second pivot means 44 and the spring means 40 can occur by fastening together the second housing portion 80 and the first housing portion 78 by fastening means 79 such as high strength bolts. When pivoting of the beam 38 occurs as a result of vertical engine loads, the spring means 40 will be loaded causing strains in the elastomer body 46. A taper angle is added to the body of elastomer 46 such that it tapers from thinnest to thickest in the aft direction. This will help to equalize the strains imposed. The housing 42 is attached to the strut 34 by fastening means 96 such as high strength bolts. The shear loads are carried by shear restraining means 54 such as a shear pin or a pilot. A thrust link attachment 52 can be integral to the housing 42 if required for transferring thrust loads into the housing 42. In this embodiment it is a clevis type arrangement.

Figure 2:
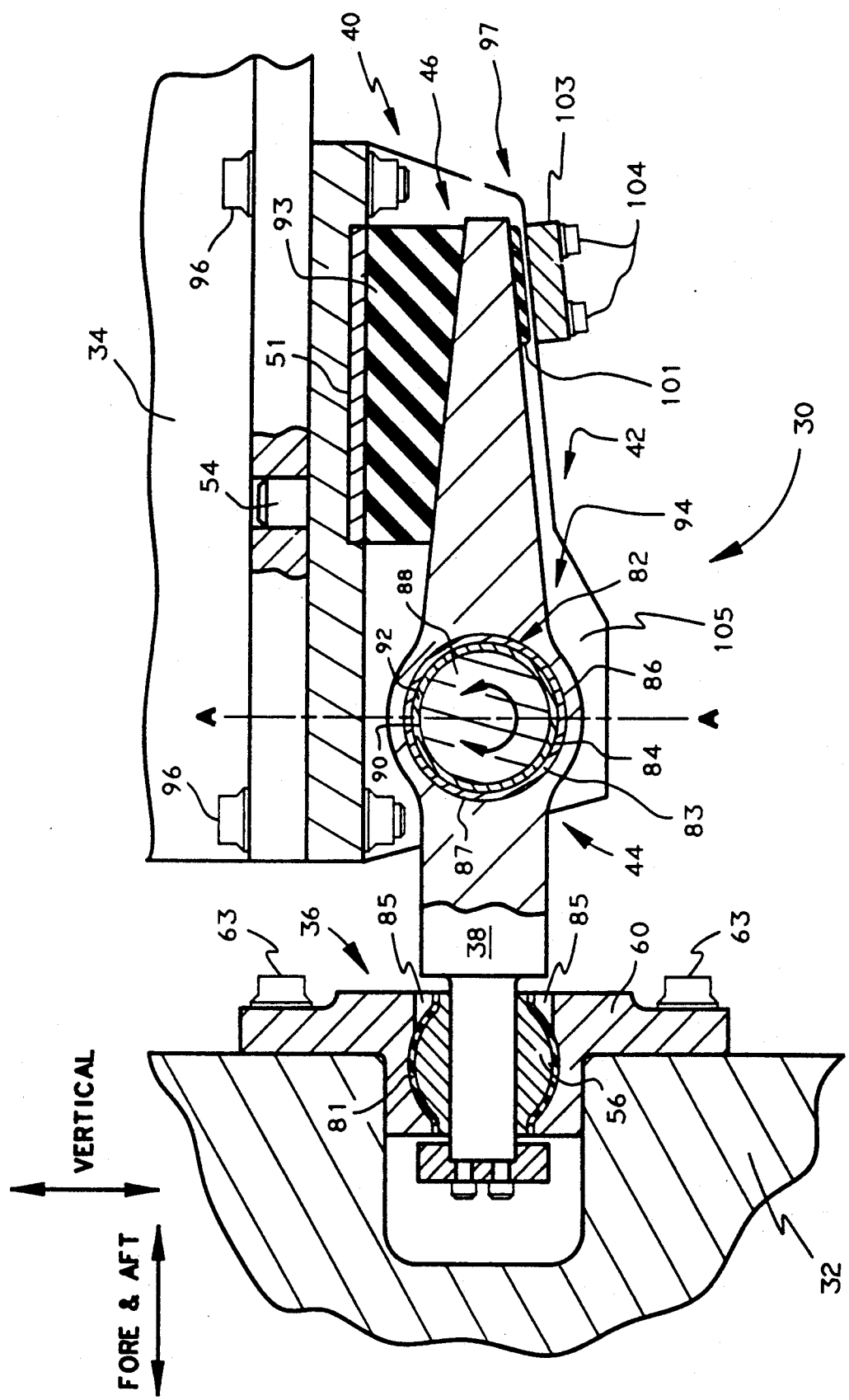
FIG. 2 is a side view in partial section of an embodiment comprising a first reduced friction pivot joint, a second reduced friction pivot joint, a single elastomeric compression pad and a snubbing element.

Referring now to another embodiment of the resilient engine mounting 30 in FIG. 2, the first pivot means 36 is attached to engine 32 by fastening means 63 in the same way as the previous embodiment except, the friction reducing means 81 for reducing cocking friction is shown as an impregnated fabric liner such as phenolic impregnated nylon or equivalent. Although, other friction reducing means such as teflon, nylon, dry film lubricant, or filled grease may be used as well. The outer member 60 may have Messerschmitt slots 85 for ease of installation of inner member 56. Also used are staked inserts for retaining the inner member 56 in relation to the outer member 60. The outer surface of the beam pilot 58 or inner surface of the inner member 56 can also be treated with a friction reducing means 57 such as teflon, nylon, dry film lubricant, or a filled grease. This is for allowing sliding of the beam 38 relative to the engine 32 in the fore and aft direction. The second pivot means 44 of FIG. 2 is also a fabric-lined bearing acting as a friction reducing means 92 for reducing the rotational and lateral sliding friction between the inner pin 88 and the sleeve 83. The friction reducing means 92 is placed between the inner surface of the sleeve 84 and the outer surface of the pin 90. The sleeve 83 is press fit into a bore 87 in the beam 38 for providing restraint of the sleeve 83 relative to the beam 38 in the lateral and rotational directions.

The configuration of the second pivot means 44 is preferably a pivotable tubeform member 82 or cylindrical arrangement. The purpose of the second pivot means 44 is to allow rotation and lateral movement, yet restrain fore and aft movements and rotations about axis A—A. A single lined tubeform is shown extending across the width of the beam 38. However, there could be more than one tubeform, for example one on each side of the beam 38 and the beam 38 could be of box shape and the friction reducing means could be elastomeric as well. The second pivot means 44 could also be conical or chevron in shape for providing some lateral restraint, yet still allowing rotation. As shown, the friction reducing means 92 is an impregnated fabric liner such as phenolic impregnated nylon or equivalent. But, other friction reducing means such as teflon, nylon, dry film lubricant, or filled grease may be used.

A spring means 40 is shown in FIG. 2 near the end of the beam 38. In this embodiment, the body of elastomer 46 is a single load carrying element 93 without shims. The elastomer element 93 is preferably bonded to both a upper end plate 51 and beam 38. A snubbing means 97 comprised of an elastomer pad 101 is preferably bonded near the end of beam 38 for providing restraint for vertical engine up loads applied at the first pivot means 36 and preventing metal to metal contact. Any suitable material for pad 101 is acceptable such as natural rubber and blends, polybutadiene blends, nitriles, neoprenes, fluorocarbons, silicones, fluorosilicones, urethanes or similar materials. The snubbing loads are reacted into upload plate 103 which is fastened to housing 42 by fastening means 104 such as high strength bolts. The housing 42 is comprised of a clevis 94 with two downwardly extending arms 105, only one of which is shown. The arms are preferably parallel and each has a hole therein for accepting the pin 88. As in the previous embodiment, the housing 42 attaches to the structure 34 by fastening means 96 and shear loads are taken by shear restraining means 54 shown as a shear pin.

Referring now to FIG. 3, a portion of the resilient engine mounting 30 is shown. The beam 38 has second pivot means 44 and a spring means 40. In this embodiment, the friction reducing means 92 is an elastomeric tubeform 106 and is comprised of sleeve 83 and inner pin 88 which may be hollow. The elastomeric tubeform 106 further comprises a body of elastomer 47 of cylindrical laminated elastomer and inelastic shim 100 construction and incorporates at least one inelastic shim 100. The shim 100 can be made of any suitable material such as 15-5 PH, 17-7 PH, 4130 steel, 4140 steel, 6000/7000 series aluminum, fiber reinforced composites either flexible or rigid matrix, or engineered plastics. Elastomer used could be natural rubber and blends, polybutadiene blends, nitriles, neoprenes, fluorocarbons, silicones, fluorosilicones or other suitable materials.

This embodiment has a clevis 94 comprised of two arms 105 as part of the housing having a hole formed therein partially therethrough said arms 105 for accepting ends of said pin 88. One of the arms 105 is detachable from a portion of housing 42 by fastening means 95 and 95' such as high strength bolts. In addition, a safety or retention feature can be added by bolting a cross member (not shown) between arms 105 and underneath beam 38 by fastening means 95'. The second pivot means 44, as shown, has a sleeve 83 which is bonded to the elastomer body 47, but the body of elastomer 47 could be bonded directly to the beam 38 as well, if practical. Furthermore, the inner pin 88 is bonded to the body of elastomer 47. During the assembly stage, the serrations 89 formed by a coining operation on at least one end of the pin 88 are pressed into one of said arms 105 upon tightening fastening means 95 and 95'. This results in restraint of rotation of the pin 88 relative to housing 42. The sleeve 83 is press fitted into the beam 38 to restrain it from relative rotation thereto. As in the previous embodiments, the housing 42 attaches to the strut 34 by attachment means 96 such as high strength bolts.

The embodiment of FIG. 4 shows a housing 42 with a clevis 94, said housing 42 being attached to a structure 34 fastening means 96 such as high strength bolts. A portion of said beam 38 is shown pivotally mounted to the housing 42, with a spring means 40 mounted near one end of said beam 38. The spring means 40 is a metal mesh element 102 and is manufactured by Lord and known as Lord coilform metal mesh. The coilform metal mesh is fully described in the commonly assigned U.S. Pat. No. 4,514,458 issued to Thorn and Gupta herein incorporated by reference. Further, this embodiment has holes formed through each arm 105 of clevis 94 for accepting pin 88. Pin 88 is simultaneously passed through beam 38 and then is locked to housing 42 by fastening means 108 such as high strength bolts. As shown in FIG. 5, the pin 88 has an outer surface 90 which contacts the friction reducing means 92 shown in FIG. 4 such as teflon, nylon, dry film lubricant, or filled grease. The pin 88 has locking means 98 attached, such as a flange with holes 99 therethrough. This locking means 98 locks the pin 88 from rotation relative to the housing 42.

Figure 6:
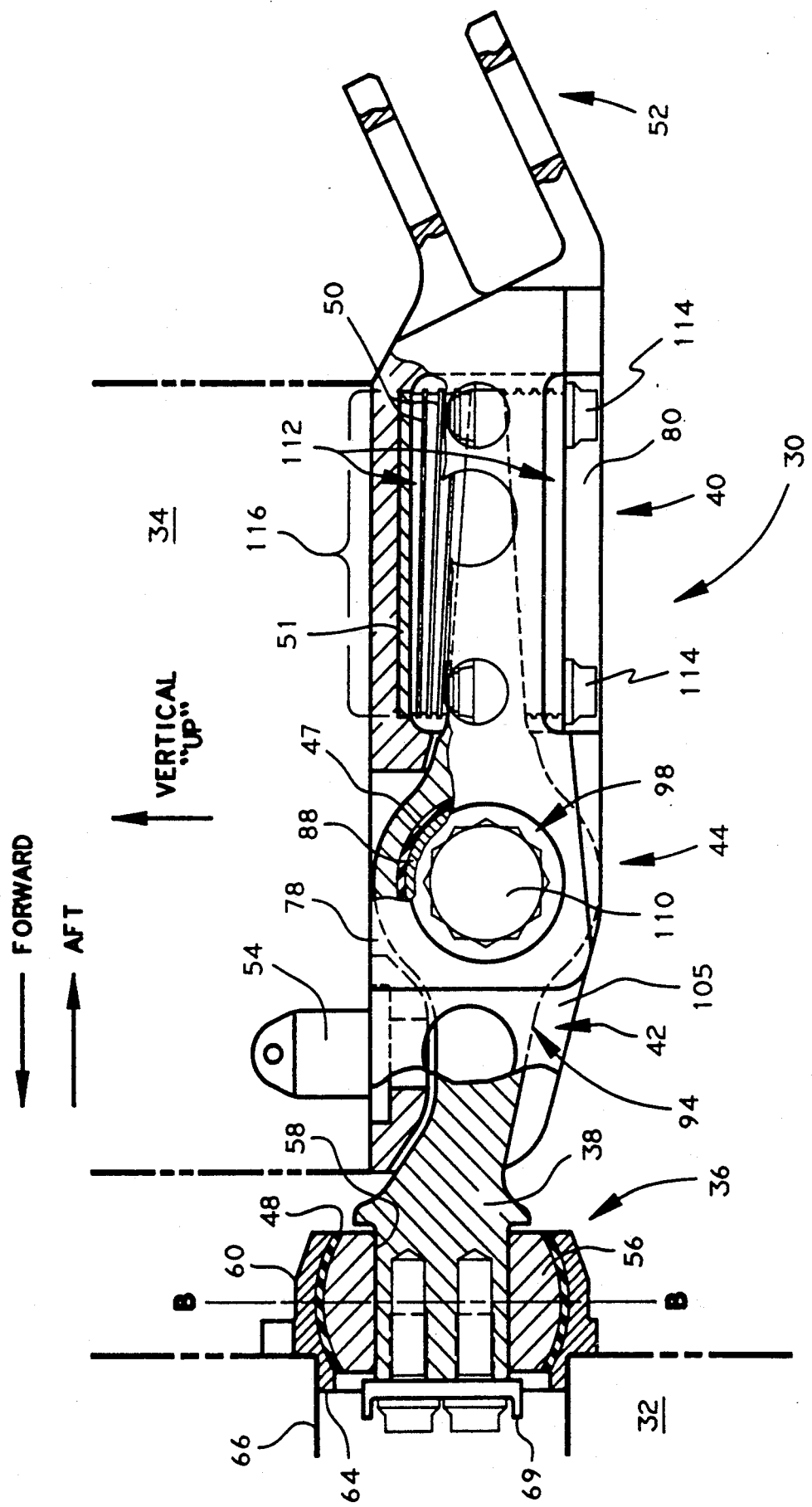
FIG. 6 is an side view of the preferred embodiment in partial section, comprising a first elastomeric pivot, a second elastomeric pivot and two precompressed laminated compression pads.

Referring now to the preferred embodiment (best mode) of FIG. 6, the resilient engine mounting 30 is particularly useful for a front engine mounting for a jet engine and is comprised of a first pivot means 36, second pivot means 44, spring means 40, housing 42 and beam 38. The mounting 30 attaches to the aircraft engine 32 (shown in phantom lines) at recess 66 in said engine 32 and to structure 34 (shown in phantom lines) by fastening means (not shown) such as a combination of barrel nuts and high strength bolts. The firsst pivot means 36 is comprised of an outer member 60 which has a housing pilot 64 for locating the recess on the engine 66, an inner member 56 attaches slidably to a cylindrical pilot 58 on the beam 38, the bore formed through the inner member 56 and the cylindrical pilot 58 are both coated with a solid film lubricant such as Perma "Slik G". A snubbing plate 69 attached to the forward end of the beam 38 limits the motion of the engine 32 to about 0.125 inch in the forward direction, while a lip on the beam 38 limits the motion of the engine to about 0.125 inch in the aft direction.

The first pivot means 36 can pivot about the axis B—B and also about an axis perpendicular to B—B going into and out of the paper. Thus, the elastomer accommodates cocking in pure shear. The elastomer for the truncated spherical body of elastomer 48 is natural rubber. The mounting 30 has a very low spring rate in the forward and aft directions until snubbing occurs, then the spring rate is approximately the radial stiffness of the second pivot means 44. The second pivot means 44 has an inner pin 88 and locking means 98 such as the serrations 89 previously mentioned and a through fastener 110. The beam 38 has a preferably cylindrical bore laterally therethrough, and the body of elastomer 47 is again natural rubber. The pin 88 is also preferably cylindrical in shape. The body of elastomer 47 of natural rubber is bonded to the inner surface of the bore 87 through the beam 38 and to the outer surface of the pin 88 using a standard bonding process. At least one of the ends of the inner member has serrations on it similar to those shown as item 89 of FIG. 3 for restraining rotation of the pin 88 relative to the housing 42. The serrations which act as locking means 98 come into contact with the inside surface of the arms 105 on the clevis 94 when the through fastener 110 is tightened. The through fastener 110 can be a combination high strength bolt and nut or a bolt engaging a threaded portion in one of the arms 105. Other means for locking the inner member 88 from rotation are equally acceptable.

The spring means 40 in this preferred embodiment is of laminated inelastic shim 50 and elastomer construction. There are two laminated elastomeric elements 112 making up the spring means 40. The elements 112 are preferably bonded to the beam 38, to upper end plate 51, the shims 50 and second housing portion 80. The elastomeric elements 112 are precompressed by fastening means 114 such as high strenth bolts. The upper end plate 51 is restrained from movement by being recessed into a pocket 116 in upper housing portion 78. Shear restraining means 54 such as a shear pin accommodates the shear loads into the structure 34. A thrust link attachment means 52 shown as a clevis is added for allowing transfer of thrust loads into the housing 42.

Figure 7:
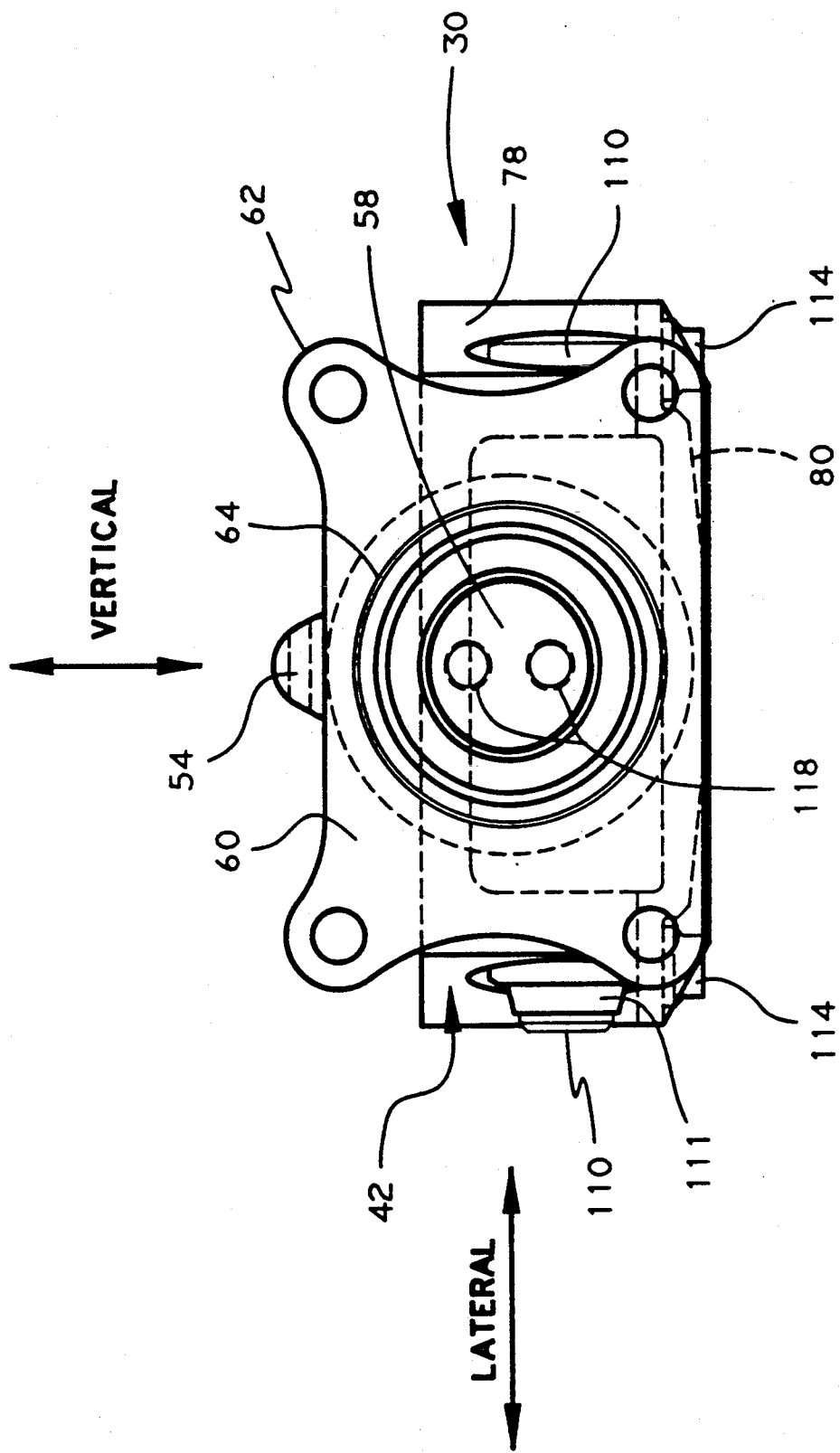
FIG. 7 is a front view of the preferred embodiment showing the attachment outer member, a pilot on the beam, holes for accepting the snubbing plate and a portion of the housing.

FIG. 7 is a front view of the preferred embodiment mounting 30. Shown are the pilot 64 and flanges 62 on the outer member 60. Also shown are the cylindrical pilot 58 of beam 38 and the tapped holes 118 for attaching the snubbing plate 69. The shear restraining means 54 is shown as a shear pin, preferably located at or near the center line of the mounting 30. Fastening means 114 are shown as high strength bolts which attach second housing portion 80 to first housing portion 78. A through bolt 110 and nut 111 lock the inner member 88 from rotating relative to the housing 42, such that rotational motion is taken by the body of elastomer 47 in the second pivot means 44 as torsional shear.

Figure 8:
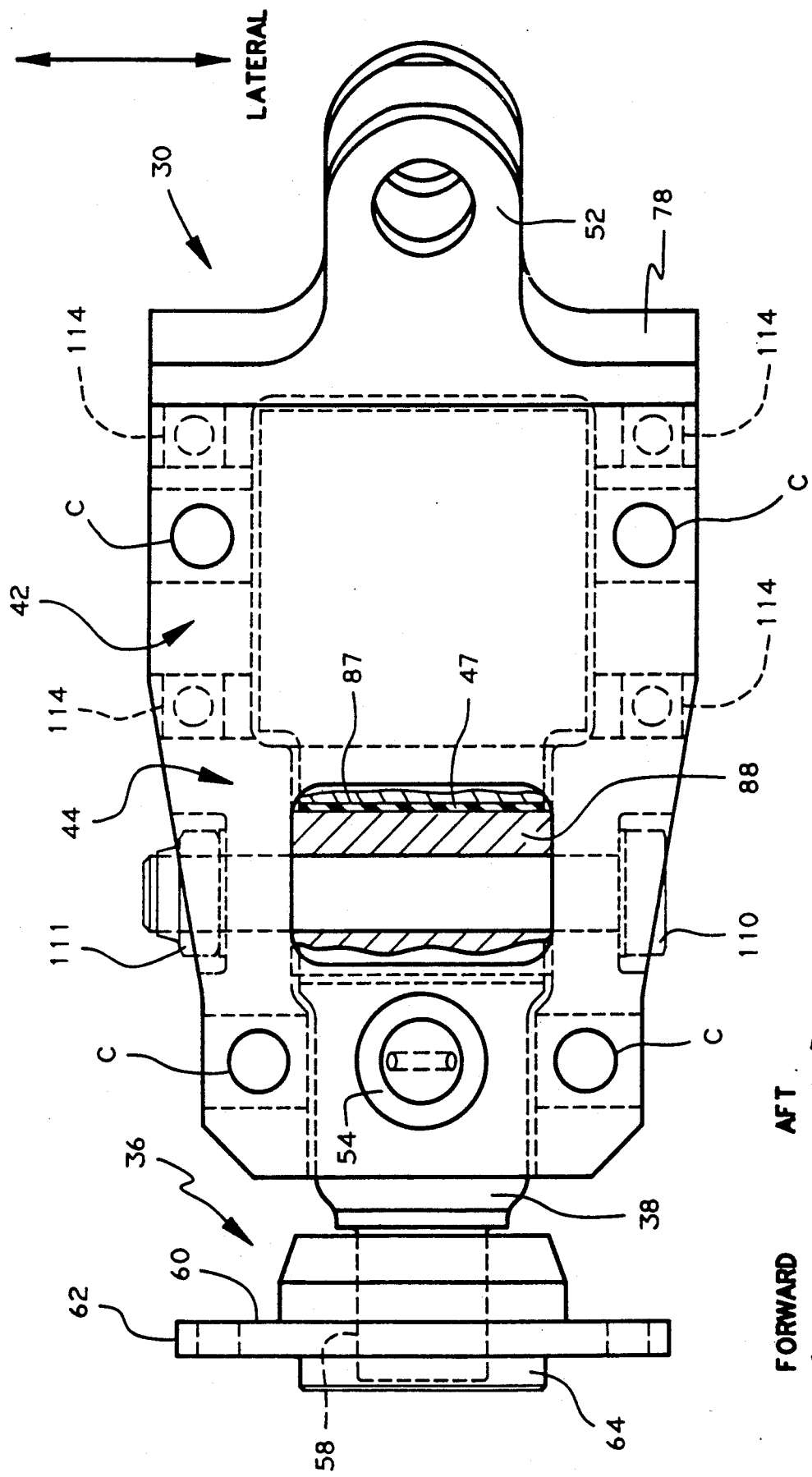
FIG. 8 is a top view of the preferred embodiment with portions broken away showing the pivot bolt, the outer member, the shear pin, and thrust link attachment to the housing.

FIG. 8 is a top view of the preferred embodiment mounting 30. Shown are the pilot 64 and flanges 62 on the outer member 60 of the first pivot means 36. Also shown is the cylindrical pilot 58 of the beam 38, the bore 87 through said beam 38 at the second pivot means 44. The shear restraining means 54 is shown as a shear pin. Fastening means 114 are shown in dotted lines and comprise high strength bolts and barrel nuts which attach second housing portion 80 (not shown) to first housing portion 78. A through bolt 110 and nut 111 lock the inner member 88 from rotating relative to the housing 42, such that rotational motion is taken by the body of elastomer 47 in the second pivot means 44 as torsional shear. A thrust link attachment means 52 is added for allowing transfer of thrust loads into the housing 42. The mounting 30 attaches to the strut 34 (not shown) by fastening means which attach at the holes labeled C.

From the foregoing, it should be apparent that the present invention now provides a resilient pivot mount which is particularly suited for engine mount applications. The problem of how to provide soft spring rates yet still be able to accommodate the resulting large deflections is solved. Also, the pivot mount lends itself to providing the capability of adding fluid for addition of damping, and tuned fluid isolator effects as is described in the commonly assigned U.S. Pat. No. 4,811,919 issued to P. J. Jones. While the preferred embodiment of the present invention has been described in detail, various modifications, alterations and changes may be made without departing from the spirit and scope of the present invention defined in the appended claims.

I claim:

1. A resilient engine mounting for flexibly attaching an aircraft engine to a structure, comprising:

(a) a first pivot means slidably receiving a first portion of a beam for connecting said beam to said engine about said first portion of said beam and accommodating pivoting motion and sliding motion of said beam relative to said engine;

(b) spring means attached at a second portion of said beam spaced along said beam from said first portion, said spring means reacting engine loads into a housing;

(c) a second pivot means located in said housing at a third portion of said beam intermediate said first portion and said second portion, said second pivot means reacting loads into said housing and allowing pivoting of said beam relative to said housing.

2. A resilient engine mounting for flexibly attaching an aircraft engine to a structure as recited in claim 1 wherein
said spring means is elastomeric.

3. A resilient engine mounting for flexibly attaching an aircraft engine to a structure as recited in claim 2 wherein
said elastomeric spring means further comprises spring means on one side of said beam.

4. A resilient engine mounting for flexibly attaching an aircraft engine to a structure as recited in claim 1 wherein
said spring means is a metal mesh element.

5. A resilient engine mounting for flexibly attaching an aircraft engine to a structure as recited in claim 1 wherein
said spring means further comprises at least two precompressed load carrying elements.

6. A resilient engine mounting for flexibly attaching an aircraft engine to a structure as recited in claim 1 wherein
said spring means attached to said second portion of said beam includes laminated inelastic shim and elastomer construction.

7. A resilient engine mounting for flexibly attaching an aircraft engine to a structure as recited in claim 1 wherein
said housing further includes means for attaching thrust links wherein thrust loads can be transferred into said housing.

8. A resilient engine mounting for flexibly attaching an aircraft engine to a structure as recited in claim 1 wherein
said housing further includes shear accommodating means for reacting shear loads.

9. A resilient engine mounting for flexibly attaching an aircraft engine to a structure as recited in claim 1 wherein
said first pivot means further comprises a substantially spherical inner member having an outer surface with a bore therethrough for slidably accepting a cylindrical pilot on said first portion of said beam;
an outer member for fastening to said engine having a flange for attaching to said engine, a pilot on said outer member for locating in a recess in said engine, said outer member having a generally spherical inner surface;
a space between said inner surface of said outer member and said outer surface of said inner member being filled with a body of elastomer and forming a truncated spherical elastomeric section for accommodating said pivoting motion.

10. A resilient engine mounting for flexibly attaching an aircraft engine to a structure as recited in claim 9 wherein
snubbing means are provided for limiting the amount of sliding allowed along said cylindrical pilot of said beam.

11. A resilient engine mounting for flexibly attaching an aircraft engine to a structure as recited in claim 9 wherein
at least one of said cylindrical pilot on said beam or said inner member bore include friction reducing means for reducing sliding friction between said cylindrical pilot and said inner member bore.

12. A resilient engine mounting for flexibly attaching an aircraft engine to a structure as recited in claim 9 wherein
said friction reducing means are taken from the group consisting of teflon, nylon, dry film lubricants, and filled greases.

13. A resilient engine mounting for flexibly attaching an aircraft engine to a structure as recited in claim 1 wherein
said second pivot means further comprises a pivotable precompressed member having first and second caps with curved inner surfaces facing partially cylindrical surfaces formed on said beam and spaced therefrom, bodies of elastomer filling the space between said curved inner surfaces of said caps and said partially cylindrical surfaces of said beam;
said housing including first and second housing portions for accomplishing precompression of said bodies of elastomer, said housing being attached to said structure;
restraining means for preventing movement of said first and said second caps relative to said housing.

14. A resilient engine mounting for flexibly attaching an aircraft engine to a structure as recited in claim 1 wherein
said second pivoting means further comprises a pivotable tubeform member having a cylindrical outer sleeve with inner outer surfaces formed thereon, a cylindrical inner pin having an outer surface and first and second ends, and means for reducing friction between said inner surface of said cylindrical outer sleeve and said outer surface of said cylindrical inner pin during pivoting;
a housing including first and second arms of a flanged clevis for accepting said beam between said arms, said housing being attached to said structure by fastening means, said first and said second arms each having a hole formed therein for accepting said one of said first and said second ends of said cylindrical inner pin, said holes being coaxial;
said third portion of said beam having a hole formed therethrough for accepting said outer surface of said cylindrical outer sleeve;
means for locking said cylindrical inner pin to at least one of said clevis arms; and
means for locking said cylindrical outer sleeve to said beam.

15. A resilient engine mounting for flexibly attaching an aircraft engine to a structure as recited in claim 14 wherein
said means for reducing friction between said inner surface of said cylindrical outer sleeve and said outer surface of said inner pin during pivoting are selected from the group consisting of teflon, nylon, dry film lubricants, and filled greases.

16. A resilient engine mounting for flexibly attaching an aircraft engine to a structure as recited in claim 14 wherein said means for reducing friction between said inner surface of said cylindrical outer sleeve and said outer surface of said inner pin during pivoting is a tubeform body of elastomer between said inner surface of said sleeve and outer surface of said inner pin.

17. A resilient engine mounting for flexibly attaching an aircraft engine to a structure as recited in claim 16 wherein said tubeform elastomeric section is of laminated inelastic shim and elastomer construction.

18. A resilient engine mounting for flexibly attachign an aircraft engine to a structure as recited in claim 1 wherein said engine mounting is used for flexibly connecting the fan casing of a jet engine to the forward portion of a strut.

19. A resilient engine mounting for flexibly attaching an aircraft engine to a structure, comprising (a) a first spherical pivot slidably receiving a first portion of a beam for connecting said beam to said engine about said first portion and accommodating pivoting motion and sliding motion of said beam relative to said engine;

(b) at least one elastomeric spring attached at a second portion of said beam spaced along said beam from said first portion, said spring means being attached to and reacting engine loads into a housing;

(c) a second pivot means located in said housing formed as an elastomeric tubeform bonded to a third portion of said beam intermediate said first portion and said second portion, said second pivot means reacting loads into said housing and allowing pivoting of said beam relative to said housing.

20. A resilient engine mounting for flexibly attaching an aircraft engine to a structure, comprising (a) a first spherical pivot slidably receiving a first portion of a beam for connecting said beam to said engine about said first portion and accommodating pivoting motion and sliding motion of said beam relative to said engine;

(b) at least one elastomeric spring attached at a second portion of said beam spaced along said beam from said first portion, said spring means being attached to and reacting engine loads into a housing;

(c) a second pivot means located in said housing including at least two elastomeric tubeform members attached at a third portion of said beam intermediate said first portion and said second portion, said second pivot means reacting loads into said housing and allowing pivoting of said beam relative to said housing.

* * * * *